Patented Oct. 7, 1941

2,258,423

UNITED STATES PATENT OFFICE 2,258,423

POLYMERIZATION OF ALPHA, BETA, UNSATURATED POLYCARBOXYLIC ACID ESTERS OF POLYHYDRIC ALCOHOLS WITH VINYL COMPOUNDS

John B. Rust, West Orange, N. J., assignor to Ellis-Foster Company, a corporation of New Jersey No Drawing. Application October 25, 1938, Serial No. 236,898

5 Claims. (Cl. 260—41)

This invention relates to a process of making polymerization products and to materials specifically intended to catalyze the polymerization of vinyl derivatives with maleic acid resins. It relates more specifically to substances which will not catalyze the polymerization of vinyl derivatives alone but are unique in catalyzing the polymerization of these derivatives with polymeric condensation products of α, β-unsaturated polybasic acids and polyhydric alcohols.

It is known that various peroxides, as for instance benzoyl peroxide, acetyl benzoyl peroxide, hydrogen peroxide and other oxygen-yielding compounds as typified by the per-acids and salts of per-acids such as ammonium persulphate and sodium perborate, are active catalysts in promoting the polymerization of vinyl derivatives such as vinyl acetate, chloride, and chloracetate, vinyl benzene (styrene) and vinyl carboxylic acid (acrylic acid) and its derivatives. Atmospheric oxygen is also an active catalyst for such polymerization reactions. The above polymerizable materials are all monofunctional in character possessing but one unsaturated linkage. Vinyl derivatives such as glycerol trimethacrylate have been described. These materials are polyfunctional possessing more than one unsaturated linkage. However, all of the above described materials are simple chemical compounds possessing well defined boiling or melting points. It is to be understood that from the standpoint of the present invention the term vinyl derivative is intended also to embrace compounds containing substituted vinyl or vinylidene groups such as monomeric methyl methacrylate.

It has now been found that ascaridol which is a naturally occurring, unsaturated peroxide having the structure

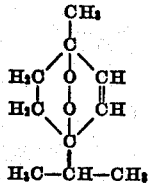

does not accelerate the polymerization of these simple vinyl compounds such as are described above. As a graphic illustration of this inactivity of ascaridol, vinyl acetate may be taken as an example. Vinyl acetate will polymerize in less than 15 minutes at its boiling point with 1% of benzoyl peroxide. With no catalyst except absorbed atmospheric oxygen vinyl acetate may be boiled for 10 hours with slight polymerization whereas no greater degree of polymerization occurs with vinyl acetate refluxed for the same time with 1% ascaridol. The thickening in the latter case is presumably due to absorbed atmospheric oxygen. This inactivity of a soluble organic peroxide toward vinyl compounds is unique.

It has been found, however, that ascaridol is an active catalyst for the polymerization of polymeric condensation products of maleic acid or anhydride with polyhydric alcohols. These latter materials are resins or balsams and contain a multiplicity of unsaturated linkages in their complex molecule. Furthermore ascaridol has now been shown to be an active catalyst for the polymerization of these polymeric maleic-polyhydric alcohol resins with vinyl derivatives. This fact is surprising in view of the inactivity of ascaridol in promoting the polymerization of the vinyl derivatives themselves.

Many other distinct and unexpected differences between ascaridol and other oxygen yielding catalyzers will become apparent in the following examples. The proportions in these examples are given in parts by weight.

*Example 1.*—Four experiments with freshly distilled vinyl acetate were run using benzoyl peroxide, ascaridol, ascaridol and acetic acid and no catalyst. One per cent of catalyst was employed in each case and the liquids heated under reflux condensers at the boiling point of vinyl acetate or about 73° C. The following results were obtained.

| Catalyst | Time | Polymer |
| --- | --- | --- |
|  |  | *Percent* |
| 1% benzoyl peroxide | 15 minutes | Almost 100 |
| 1% ascaridol | 9 hours 50 minutes | 1.2 |
| Do | 22 hours 25 minutes | 2.9 |
| 1% ascaridol<br>1% glacial acetic acid | 9 hours 50 minutes | 0.6 |
| No catalyst | do | 1.5 |

It appears therefore that under the above conditions ascaridol is not a catalyst for the polymerization of vinyl derivatives but that any polymerization which occurred with ascaridol-containing materials may have resulted from polymerization by absorbed atmospheric oxygen and heat.

*Example 2.*—A polymeric glycol maleate was made by heating together 600 parts of maleic anhydride and 670 parts of diethylene glycol for 8 hours in an inert atmosphere at 200° C. A light yellow, soluble, sticky resin was obtained having an acid number of 11.6. 0.2 part of ascaridol was dissolved in 2 parts of benzene and incorporated into 40 parts of the above diethylene glycol maleate. The solution was placed in an oven at 60° C. In 16 hours the material had solidified and in 48 hours a tough rubbery composition had formed which was infusible.

Example 3.—40 parts of the diethylene glycol maleate described in Example 2 were mixed with 10 parts of vinyl acetate and 0.2 part of ascaridol. The clear solution was heated in an oven at 60° C. for 16 hours. A fully cured, transparent, infusible mass resulted, which contained no monomeric vinyl acetate.

It has been found that the action of ascaridol on copolymers of vinyl derivatives with polymeric glycol maleate is much smoother and less violent under heat than benzoyl peroxide.

Example 4.—Two casting solutions were made up using 80% diethylene glycol maleate and 20% vinyl acetate, one containing benzoyl peroxide and the other, ascaridol. They were heated in an oven at 60° C. for 18 hours. The casting containing 0.3% benzoyl peroxide cured to a hard glassy solid crazed with cracks, while that containing 0.3% ascaridol yielded a hard, tough, glassy solid which was homogeneous and free from any cracks.

Benzoyl peroxide is typical in its action on vinyl derivatives and may be taken to represent the general reactions of oxygen yielding materials hitherto used to catalyze the polymerization of vinyl compounds. It has been found that, in castings made from vinyl derivatives and polymeric glycol maleate resins catalyzed by benzoyl peroxide, soluble organic dyes are difficult to employ, since the peroxide often bleaches them substantially. At times the bleaching is complete and at other times a substantial discoloration is observed. One of the most graphic illustrations of the difference between ascaridol and other organic peroxides is in its effect on dyes. No bleaching, darkening or discoloration of organic dyed castings prepared with ascaridol has been detected.

Example 5.—A series of castings was made using 80% diethylene glycol maleate, and 20% vinyl acetate in the presence both of ascaridol and benzoyl peroxide, and heated in an oven until hardened. The results obtained with a series of representative dyes are given below:

| Dye | Benzoyl Peroxide | Ascaridol |
|---|---|---|
| Night blue | Bleached completely | No effect. |
| Sudan III | Bleached considerably | Do. |
| Brilliant Croceine 3BA | Bleached almost completely | Do. |
| French bluing | Bleached completely | Do. |
| Sulpho Rhodamine B | Bleached almost completely | Do. |

The stability of mixtures of vinyl derivatives and polymeric glycol maleates without any catalyst present at ordinary temperatures except possibly atmospheric oxygen, is about 48 hours depending, of course, upon the percentage of vinyl derivative present and also upon its character. With ascaridol present the stability is the same, indicating that ascaridol is probably inactive at ordinary temperatures.

If desired antioxidants may be employed in conjunction with ascaridol to stabilize copolymer solutions at room temperature.

Example 6.—A casting solution was made up from 80% diethylene glycol maleate described in Example 2 and 20% vinyl acetate. 0.3% of ascaridol based on the total weight of solution was added and the material divided into four parts, to which were added various proportions of resorcinol and hydroquinone. The castings were baked in an oven at 60° C. for 16 hours. The following results were obtained:

| Percent stabilizer | Appearance of casting |
|---|---|
| 0.3% resorcinol | Hard, transparent, homogeneous, crack-free. |
| 0.2% resorcinol | Do. |
| 0.1% resorcinol | Do. |
| 0.2% hydroquinone | Tough rubbery solid, crack-free. |

Ascaridol occurs to the reported extent of 60% to 70% in the oil of American wormseed *Chenopodium ambrosioides*. This material may be employed in the place of pure ascaridol to catalyze the polymerization of vinyl derivatives with polymeric glycol maleate resins.

Example 7.—106 parts of diethylene glycol maleate described in Example 2 were mixed with 40 parts of vinyl acetate containing 0.86 part of chenopodium wormseed oil. A portion of this solution was mixed with Neptune Blue BR concentrated dye. Both the dyed and undyed sample were baked in an oven at 60° C. for 48 hours. The castings were transparent, hard, crack-free and infusible. The dyed casting had not bleached, discolored nor darkened.

Example 8.—80% diethylene glycol maleate was dissolved in 20% monomeric styrene containing 0.3% ascaridol. A similar casting solution was made up using 0.43% American wormseed oil as the catalyst. Both casting solutions were baked in an oven at 60° C. for 48 hours. The castings which resulted were infusible, hard, transparent and crack-free.

Example 9.—40 parts of diethylene glycol maleate were mixed with 10 parts of methyl methacrylate containing 0.15 part of ascaridol. The solution was baked in an oven at 60° C. for 48 hours. A tough, rubbery, infusible casting was obtained.

Example 10.—2000 parts of maleic anhydride, 2040 parts of triethylene glycol and 416 parts of glycerol were heated at 200° C. for about 6½ hours in an inert atmosphere. A soft sticky resin having an acid number of 68 was obtained. 80 parts of the above resin were mixed with 20 parts of vinyl acetate containing 0.2 part of ascaridol to form a viscous clear solution. This solution was heated in an oven at 65° C. for 48 hours to yield a clear hard cast product.

Example 11.—784 parts of maleic anhydride, 248 parts of ethylene glycol and 424 parts of diethylene glycol were heated at 200°–220° C. for 11 hours in an inert atmosphere. A soft sticky resin was obtained having an acid number of 35. 80 parts of the above resin were mixed with 20 parts of vinyl acetate containing 0.2 part of ascaridol to form a clear viscous solution. This was poured into cylindrical glass molds and baked at 65° C. for 48 hours. Hard, tough, glass-like castings were obtained.

Example 12.—1800 parts of triethylene glycol and 1392 parts of fumaric acid were heated together in an inert atmosphere at 200°–220° C. for 10 hours. A very viscous balsam was obtained having an acid number of 16.2. 80 parts of this material were mixed with 26.6 parts of vinyl acetate containing 0.2 part of ascaridol to form a clear solution. This solution was baked in an oven at 65° C. for 48 hours at yield a hard, infusible, insoluble casting.

There are many other resins and balsams that may be employed such as those made from polyhydric alcohols and α,β-unsaturated aliphatic polycarboxylic acids or their anhydrides such as fumaric acid, itaconic acid, citraconic acid, and the like. Among the polyhydric alcohols which might be employed are glycerol, ethylene glycol, triethylene glycol, trimethylene glycol, propylene glycol, sorbitol, mannitol and the like.

The above described glycol maleic materials are resinous or balsamic in character and may be polymerized with ascaridol. However, the monohydric alcohol esters of maleic and fumaric acid such as methyl, ethyl and butyl esters cannot be polymerized with ascaridol. For instance, diethyl fumarate containing 1% ascaridol was heated at 100° C. for 120 hours. No polymer whatever formed in this time.

In the preceding examples a proportion of 80% polymeric glycol maleate to 20% of vinyl derivative was employed throughout for comparison purposes. However, these proportions may be varied at will to produce materials of different properties. The proportion of vinyl derivative may be greater or less depending upon the properties desired in the finished material, but in the case of vinyl acetate, for example, clear castings are only obtained when the proportion is about 30% vinyl acetate or less to 70% glycol maleates or more.

What I claim is:

1. The polymerization process which comprises heating a polyhydric alcohol ester of an $\alpha,\beta$-unsaturated aliphatic polycarboxylic acid in the presence of catalytic material comprising ascaridol.

2. The polymerization process which comprises heating a polyhydric alcohol ester of an $\alpha,\beta$-unsaturated aliphatic polycarboxylic acid with a monomeric vinyl derivative miscible therewith and selected from the group consisting of vinyl esters, acrylic esters, methacrylic ester and styrene, in the presence of ascaridol.

3. The polymerization process which comprises heating a polyhydric alcohol ester of maleic acid with a monomeric vinyl derivative miscible therewith and selected from the group consisting of vinyl esters, acrylic esters, methacrylic ester and styrene, in the presence of ascaridol.

4. The process of making colored masses comprising copolymerizing a monomeric vinyl derivative selected from the group consisting of vinyl esters, acrylic esters, methacrylic ester and styrene and a polyhydric alcohol ester of maleic acid miscible therewith containing a soluble organic dye in the presence of ascaridol.

5. The polymerization process which comprises heating a polyhydric alcohol ester of an $\alpha,\beta$-unsaturated aliphatic polycarboxylic acid in the presence of oil derived from *Chenopodium ambrosioides*.

JOHN B. RUST.